(12) United States Patent
Urase et al.

(10) Patent No.: US 9,938,759 B2
(45) Date of Patent: Apr. 10, 2018

(54) CONTROL DEVICE AND CONTROL METHOD OF VEHICLE OPENING-CLOSING MEMBER

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Hiroshi Urase, Kariya (JP); Takeshi Nishikibe, Kariya (JP); Toshiro Maeda, Kariya (JP); Eiji Itami, Kariya (JP); Takeshi Katsuda, Toyota (JP); Masahiko Itoh, Toyota (JP); Yoshinori Hitomi, Toyota (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 20 days.

(21) Appl. No.: 15/032,566

(22) PCT Filed: Oct. 24, 2014

(86) PCT No.: PCT/JP2014/005403
§ 371 (c)(1),
(2) Date: Apr. 27, 2016

(87) PCT Pub. No.: WO2015/064071
PCT Pub. Date: May 7, 2015

(65) Prior Publication Data
US 2016/0265261 A1    Sep. 15, 2016

(30) Foreign Application Priority Data

Oct. 29, 2013  (JP) ................................ 2013-224061

(51) Int. Cl.
*E05F 15/632* (2015.01)
*E05B 83/40* (2014.01)
(Continued)

(52) U.S. Cl.
CPC ................. *E05F 15/60* (2015.01); *B60J 5/06* (2013.01); *E05B 81/72* (2013.01); *E05F 15/659* (2015.01);
(Continued)

(58) Field of Classification Search
USPC ....... 318/264–266, 272, 275, 277, 282, 286, 318/466–469, 626
See application file for complete search history.

(56) References Cited

U.S. PATENT DOCUMENTS

| 4,916,861 A | 4/1990 | Schap |
| 5,184,049 A * | 2/1993 | Kiuchi .................... H02P 3/22 318/362 |

(Continued)

FOREIGN PATENT DOCUMENTS

| CN | 2683455 Y | 3/2005 |
| JP | 2-300487 A | 12/1990 |

(Continued)

OTHER PUBLICATIONS

Notification of Reasons for Refusal dated Oct. 4, 2016 in Japanese Patent Application No. 2013-224061 (with English language translation).

(Continued)

*Primary Examiner* — Bentsu Ro
(74) *Attorney, Agent, or Firm* — Oblon, McClelland, Maier & Neustadt, L.L.P.

(57) ABSTRACT

One embodiment of the present invention provides a control device of a vehicle opening-closing member that includes a vehicle state determination unit that determines a traveling state of the vehicle based on a signal indicating a traveling state of a vehicle; an open/close state determination unit that determines an opening/opened state of the opening-closing member based on a signal indicating an opening/opened state of an opening-closing member provided to the vehicle; and a control unit that outputs a control signal for stopping (Continued)

an opening motion of the opening-closing member when it is determined by the vehicle state determination unit that the vehicle is in a state of traveling and when it is determined by the open/close state determination unit that the vehicle opening-closing member is in an opening/opened state.

12 Claims, 11 Drawing Sheets

(51) Int. Cl.
  *B60J 5/00*  (2006.01)
  *E05F 15/60*  (2015.01)
  *B60J 5/06*  (2006.01)
  *E05F 15/659*  (2015.01)
  *E05B 81/72*  (2014.01)
(52) U.S. Cl.
  CPC ....... *E05Y 2400/30* (2013.01); *E05Y 2400/52* (2013.01); *E05Y 2900/531* (2013.01)

(56) References Cited

U.S. PATENT DOCUMENTS

| | | | |
|---|---|---|---|
| 6,863,336 B2 | 3/2005 | Yokomori et al. | |
| 7,212,897 B2* | 5/2007 | Suzuki | E05F 15/40 318/282 |
| 8,471,503 B2* | 6/2013 | Oakley | B60J 5/06 318/266 |
| 2001/0024093 A1 | 9/2001 | Naganuma | |
| 2009/0237023 A1 | 9/2009 | Suzuki et al. | |

FOREIGN PATENT DOCUMENTS

| | | |
|---|---|---|
| JP | 2001-246936 A | 9/2001 |
| JP | 3494274 B2 | 2/2004 |
| JP | 2005-1573 A | 1/2005 |
| JP | 2009-127301 A | 6/2009 |
| JP | 2012-67480 A | 4/2012 |

OTHER PUBLICATIONS

Extended European Search Report dated Oct. 14, 2016 in Patent Application No. 14858114.3.
International Preliminary Report on Patentability and Written Opinion of the International Searching Authority dated May 3, 2016 in PCT/JP2014/005403 (with English language translation).
International Search Report dated Jan. 13, 2015 in PCT/JP14/05403 Filed Oct. 24, 2014.
Combined Office Action and Search Report dated Aug. 18, 2017 in Chinese Patent Application No. 201480059412.0 (with English translation).

* cited by examiner

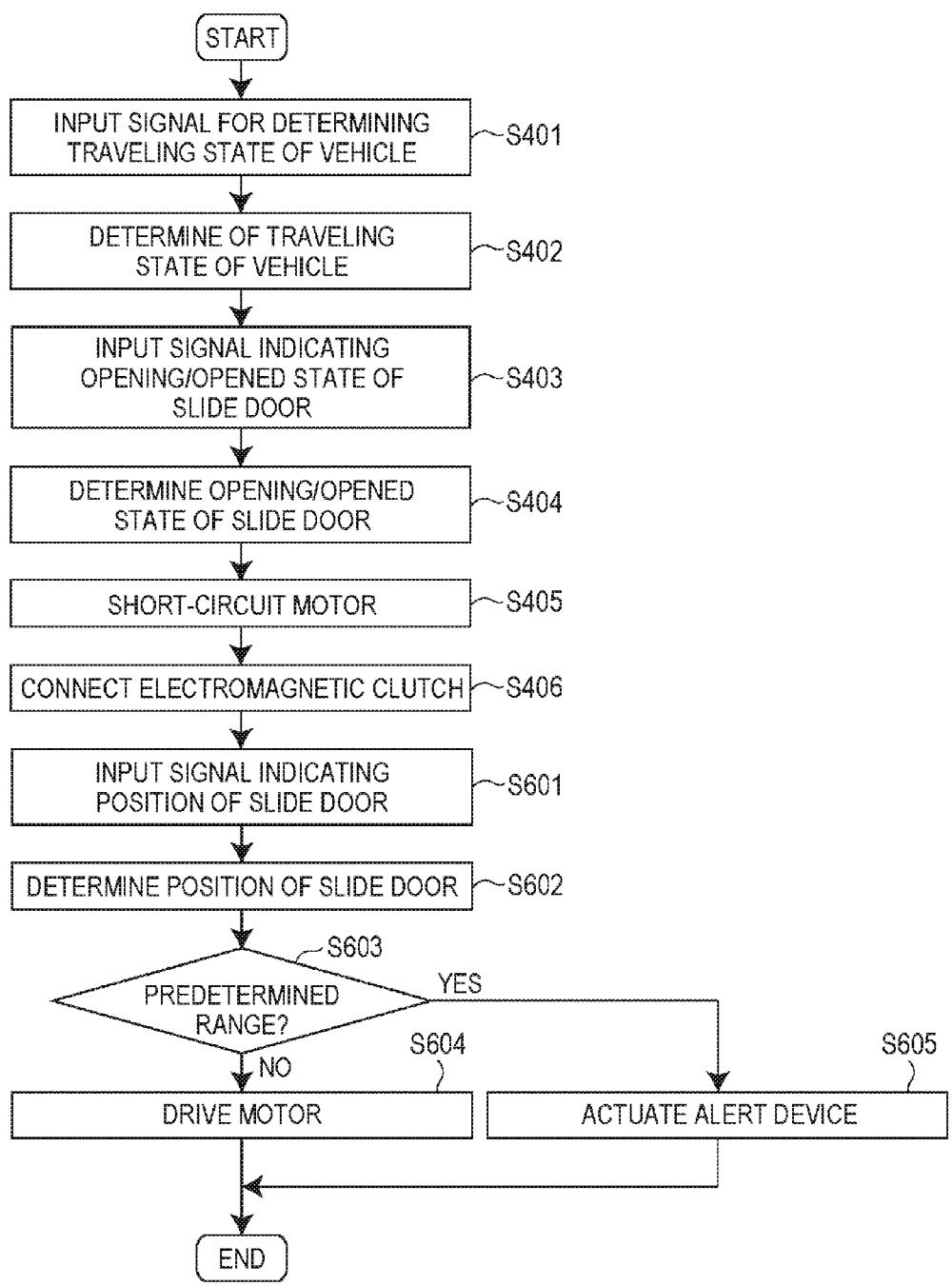

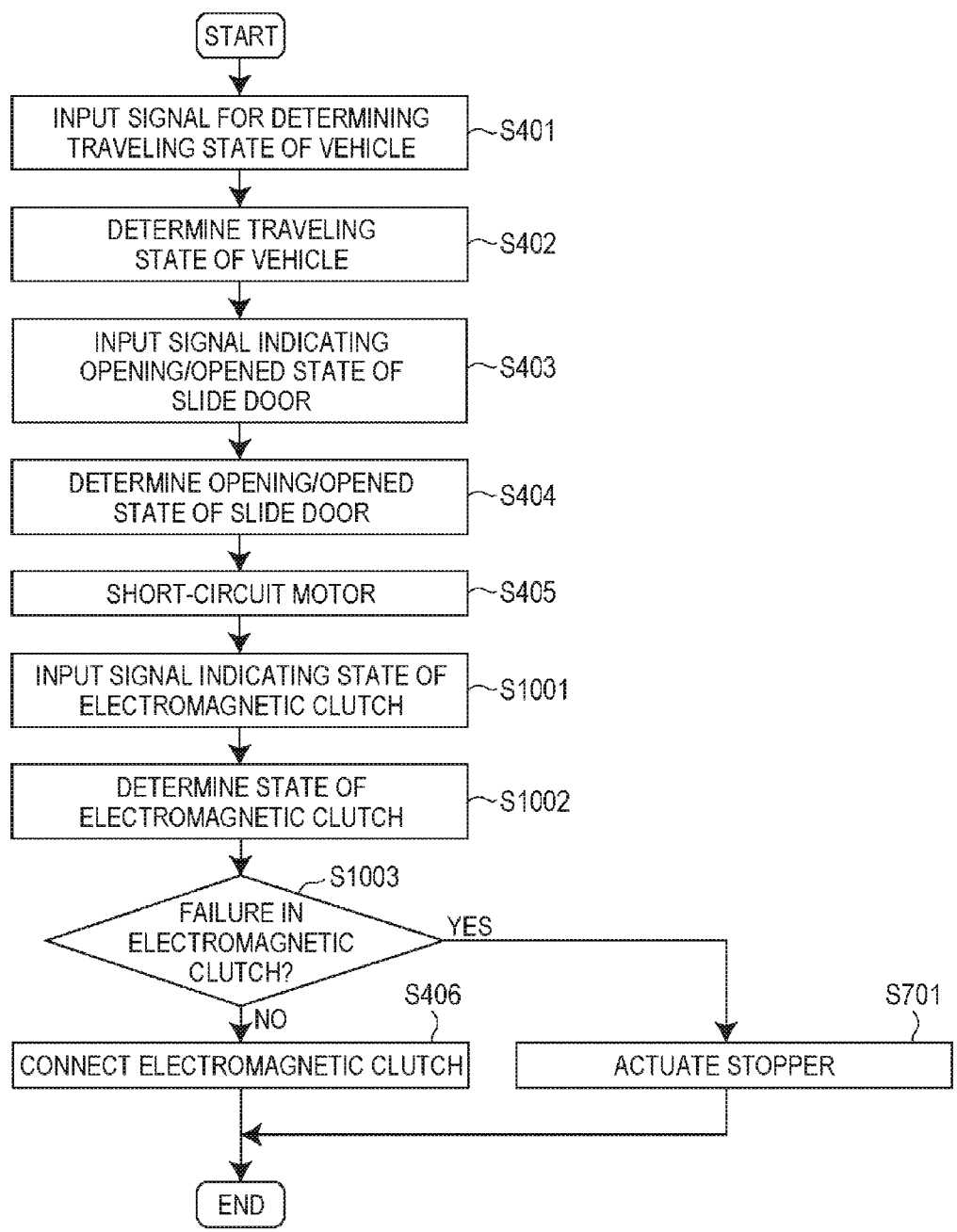

CONTROL DEVICE AND CONTROL METHOD OF VEHICLE OPENING-CLOSING MEMBER

TECHNICAL FIELD

The present invention relates to a control device of a vehicle opening-closing member that realizes a fail-safe against an unintended opening motion (opening) of a vehicle opening-closing member during a vehicle traveling, and relates to a control method of the same.

BACKGROUND ART

Conventionally, a technique of automatically releasing a lock and latch of a vehicle door by driving a motor has been known (see Patent Literature 1). In the technique of Patent Literature 1, in response to a door opening signal transmitted from a wireless remote controller, a control unit automatically releases a door lock and latch by driving a door locking motor and a latching motor to actuate the vehicle door in an opening direction until a predetermined opening degree is reached.

CITATION LIST

Patent Literature

Patent Document 1: Japanese Patent Application Laid-Open No. 2005-1573

SUMMARY OF INVENTION

Technical Problem

In the technique of Patent Document 1, there is a problem that, when a latch of a vehicle opening-closing member is released due to a malfunction or failure, this causes an unintended motion of the vehicle opening-closing member. Therefore, the present invention is intended to provide a control device and a control method of a vehicle opening-closing member that realize a fail-safe against an unintended opening motion (opening) of the vehicle opening-closing member during the vehicle traveling.

Solution to the Problem

One embodiment of the present invention provides a control device of a vehicle opening-closing member, in which the control device includes: a vehicle state determination unit that determines a traveling state of the vehicle based on a signal indicating a traveling state of a vehicle; an open/close state determination unit that determines an opening/opened state of the opening-closing member based on a signal indicating an opening/opened state of an opening-closing member provided to the vehicle; and a control unit that outputs a control signal for stopping an opening motion of the opening-closing member when it is determined by the vehicle state determination unit that the vehicle is in a state of traveling and when it is determined by the open/close state determination unit that the opening-closing member is in an opening/opened state.

Advantageous Effects of Invention

The control device and the control method of a vehicle opening-closing member according to one embodiment of the present invention outputs a control signal for stopping a motion of an opening-closing member upon determining an opening/opened state of the opening-closing member provided to a vehicle during the vehicle traveling. In response to this control signal, at least one of a connection of an electromagnetic clutch, a short circuit a motor that opening/closing-drives the opening-closing member, and an actuation of a stopper that inhibits a motion of the opening-closing member in the opening direction is performed and thereby the opening motion of the opening-closing member is stopped. Therefore, even when a vehicle opening-closing member is unintendedly opened during the vehicle traveling, the control device and the control method can stop the opening motion of the vehicle opening-closing member and realizes a fail-safe against an unintended opening motion of the vehicle opening-closing member during the vehicle traveling.

BRIEF DESCRIPTION OF DRAWINGS

FIG. 6 is a control flowchart of a control device of vehicle opening-closing member according to a third embodiment.

FIG. 10 is a control flowchart of a control device of a vehicle opening-closing member according to a seventh embodiment.

DESCRIPTION OF EMBODIMENTS

Figure 1:
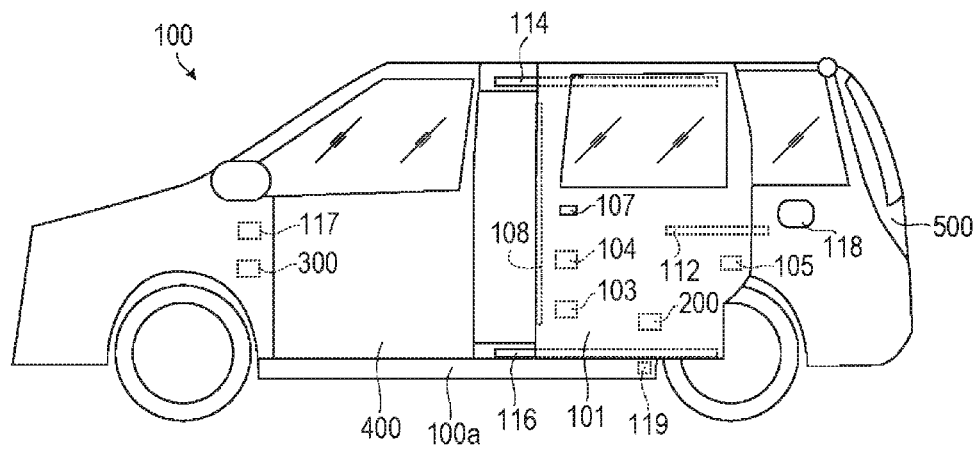
FIG. 1 is a schematic side view of a vehicle according to a first embodiment.

Exemplary embodiments for implementing the present invention will be described below in detail with reference to the drawings. Note that any size, material, shape, relative position of components, and the like can be employed in the embodiments described below, and these sizes, materials, shapes, relative positions of components, and the like may be changed in accordance with structure or various conditions of a device to which the present invention may be applied. Further, unless otherwise specified, the scope of the present invention is not limited to the aspects that are specifically described in the embodiments illustrated below.

Note that, in the drawings illustrated below, the same reference numerals are provided to those having the same function, and duplicated description thereof will be often omitted.

First Embodiment

Configuration of Vehicle

FIG. 1 is a schematic side view of a vehicle 100 according to a first embodiment of the present invention. The vehicle 100 has a slide door 101 as an opening-closing member (a vehicle opening-closing member) provided to the vehicle 100. The slide door 101 has an opening and closing mechanism driven by electric power and is supported by a center rail 112, an upper rail 114, and a lower rail 116 so as to be movable in the front and rear direction of the vehicle 100 with respect to a vehicle body 100a.

The slide door 101 has a full-open latch device 103, a front latch device 104, and a rear latch device 105. On the other hand, the vehicle body 100a is provided with a plurality of strikers (not illustrated), and each of the latch devices 103 to 105 engages to or disengages from the strikers. The full-open latch device 103 has a latch mechanism that holds the slide door 101 in a fully opened state, and the front latch device 104 and the rear latch device 105 have latch mechanisms that hold the slide door 101 in a fully closed state. Note that, while the present specification provides description by exemplifying the slide door 101 as an opening-closing member, the opening-closing member provided to the vehicle 100 is not limited to the slide door 101 but may be an electric swing door 400 or backdoor 500, or a manual slide door, swing door, or backdoor.

The vehicle 100 further has an alert device 117 that provides an alert to a user by a light, a sound, and/or a display, a courtesy switch 119 that detects opening and closing of the slide door 101, and a set of sensors 300 comprising a plurality of sensors. As will be described later, respective sensors 301 to 310 of the set of sensors 300 have respective predetermined sensing functions, and an ECU 200 can use signals from respective sensors 301 to 310 in order to implement the predetermined functions.

Configuration of Vehicle Opening-Closing Member

Figure 2A:
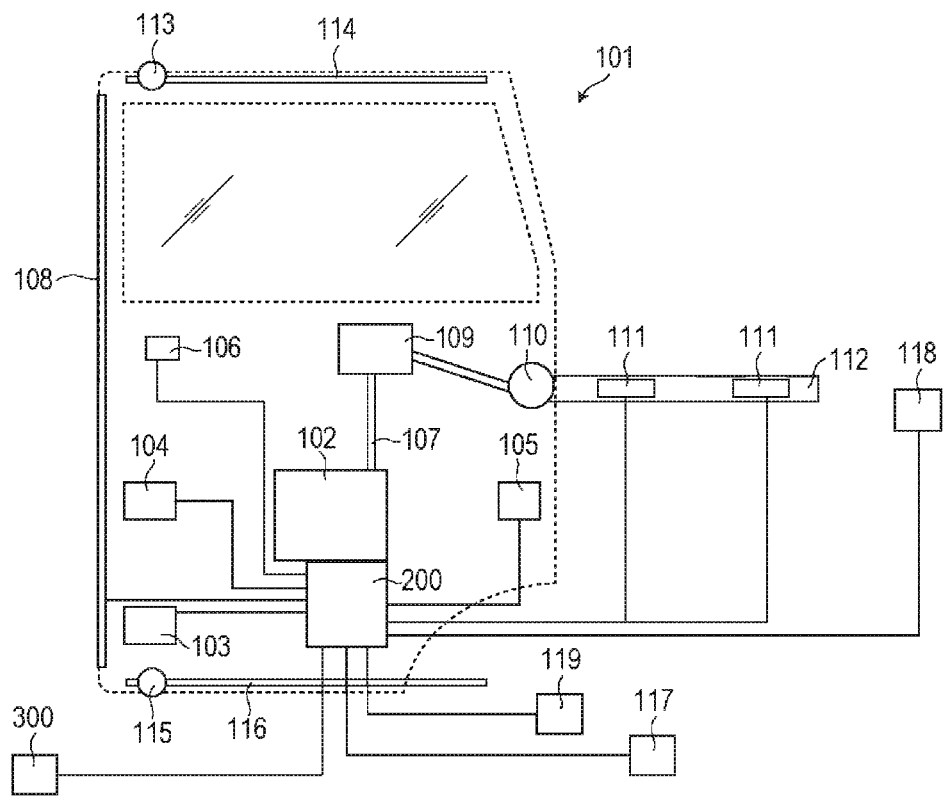
FIG. 2A is a schematic configuration diagram of a vehicle opening-closing member according to the first embodiment.
Figure 2B:
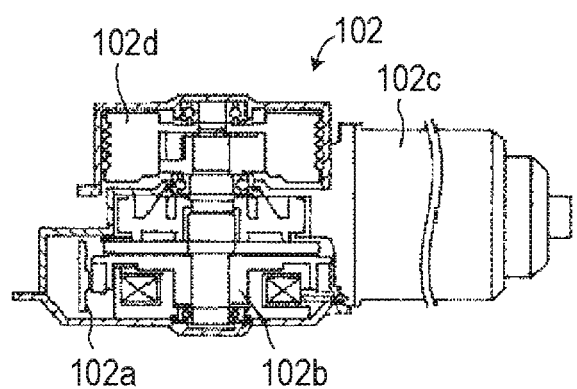
FIG. 2B is a schematic sectional view of an opening/closing driving device according to the first embodiment.

FIG. 2A is a schematic configuration diagram of the slide door 101 as an opening-closing member provided to the vehicle 100, and FIG. 2B is a schematic sectional view of an opening/closing driving device 102. The configuration of the slide door 101 will be described below in detail.

The opening/closing driving device 102, the full-open latch device 103, the front latch device 104, the rear latch device 105, an operating switch 106, a touch sensor 108, a guide pulley 109, and the ECU (Electronic Control Unit) 200 are mounted on the slide door 101. Note that the ECU 200 may be mounted to a desired position inside the vehicle 100 without limited to the slide door 101.

The slide door 101 is supported on the center rail 112, the upper rail 114, and the lower rail 116 via a center roller 110, an upper roller 113, and a lower roller 115, respectively, so as to be movable in the front and rear direction of the vehicle 100.

The ECU 200 controls a relay within an output circuit connected to the opening/closing driving device 102 to invert the polarity of a voltage applied to a motor 102c that opening/closing-drives the slide door 101 (the opening-closing member). Thereby, the rotation direction of the motor 102c is changed and the opening/closing direction of the slide door 101 is controlled. Note that, in a state where an electromagnetic clutch 102b is not connected ("disconnected state"), the user is able to manually open and close the slide door 101.

A pulse sensor 102a is a hall element or the like and outputs, to the ECU 200, a pair of pulse signals whose phases are different from each other. The ECU 200 can detect the rotation amount, the rotational speed, and the rotational direction of the motor 102c based on the pulse signals to determine the position, the moving speed, and the moving direction of the slide door 101.

The full-open latch device 103, the front latch device 104, and the rear latch device 105 have latch mechanisms including latch switches 103a to 105a and release/close (R/C) motors 103b to 105b, respectively. In response to a control signal from the ECU 200, each of the R/C motors 103b to 105b drives a latch of each of the latch devices 103 to 105 to engage or disengage it with respect to the corresponding striker. The latch switches 103a to 105a output, to the ECU 200, signals indicating states ("latch state") of engagement or disengagement between latches of the latch devices 103 to 105 and the strikers, respectively. Based on these signals, the ECU 200 can determine whether the slide door 101 is opened or closed by detecting a latch state of each of the latch devices 103 to 105. Here, "latch state" includes an unlatched state where a latch and a striker are fully disengaged, a full-latch state where a latch and a striker are fully engaged, and a half-latch state where a latch and a striker are not fully engaged or disengaged.

For example, when a signal indicating a full-latch state is input from the latch switch 103a of the full-open latch device 103, the ECU 200 can determine that the slide door 101 fully opened. When signals indicating a full-latch state are input from the latch switch 104a of the front latch device 104 and the latch switch 105a of the rear latch device 105, the ECU 200 can determine that the slide door 101 is fully closed. When the slide door 101 is fully closed and when a signal indicating a half-latch state or an unlatched state is input from at least one of the latch switch 104a and the latch switch 105a, the ECU 200 can determine that the slide door 101 is at a start of an opening motion or during an opening motion. Further, when the slide door 101 is fully opened and when a signal indicating a half-latch state or an unlatched state is input from the latch switch 103a, the ECU 200 can determine that the slide door 101 is at a start of a closing motion or during a closing motion. As used herein, each of the states at a start of an opening motion, during an opening motion, and at a completion of an opening motion of the slide door 101 is referred to as "opening/opened state" of the slide door 101, and each of the states of at a start of a closing motion, during a closing motion, and at a completion of a closing motion of the slide door 101 is referred to as simply "closing/closed state" of the slide door 101. In particular, a state where the slide door 101 is fully opened is referred to as "fully opened state", and a state where the slide door 101 is fully closed is referred to as "fully closed state". As used herein, the fully opened state is a state included in an opening/opened state, and the fully closed state is a state included in a closing/closed state.

Further, the courtesy switch 119 outputs, to the ECU 200, a signal indicating an opening/opened state or a closing/closed state ("open/close state") of the slide door 101. The ECU 200 may determine an open/close state of the slide door 101 based on this signal.

The operating switch 106 is mounted on an outside handle of the slide door 101 and outputs, to the ECU 200, a signal instructing opening or closing of the slide door 101 in response to a user operation. In response to this signal, the ECU 200 outputs a control signal to the opening/closing driving device 102, and the opening/closing driving device 102 opening-actuates or closing-actuates the slide door 101.

The touch sensor 108 is an electrostatic capacitance sensor and is mounted on the front edge of the slide door 101. Upon reacting during a closing motion of the slide door 101, the touch sensor 108 outputs, to the ECU 200, a signal indicating that insertion of an object between the vehicle body 100a and the slide door 101 is detected. Based on this signal, the ECU 200 can recognize insertion of an object between the vehicle body 100a and the slide door 101.

Stoppers 111 mounted on the center rail 112 and a fuel filler lid 118 of the vehicle 100 operate in response to a control signal from the ECU 200 and can inhibit movement of the slide door 101 in the opening direction and stop the slide door 101. Specifically, when there is an unintended opening motion or closing motion of the slide door 101, the stoppers 111 project from the center rail 112 in response to a control signal from the ECU 200 and can stop the slide door 101. Further, when there is an unintended opening motion of the slide door 101, the fuel filler lid 118 opens in response to a control signal from the ECU 200 and can stop the slide door 101. Note that the stoppers 111 may be of any structure, and the structure of the stoppers 111 illustrated in FIG. 7A to FIG. 7C described later may be employed.

The alert device 117 can provide an alert to the user by generating a light and/or a sound or by displaying an alert to the user in response to a control signal from the ECU 200.

As illustrated in FIG. 2B, the opening/closing driving device 102 has a driving mechanism including the pulse sensor 102a, the electromagnetic clutch 102b, the motor 102c, and a drum 102d. One end of a cable 107 is fixed to the drum 102d, and the other end of the cable 107 is guided by the guide pulley 109 and the center rail 112 and fixed to the vehicle body 100a. Therefore, the ECU 200 connects the electromagnetic clutch 102b ("connected state") and drives the motor 102c, and thereby motive power of the motor 102c transfers to the slide door 101 via the electromagnetic clutch 102b, the drum 102d, and the cable 107. In this way, the opening/closing driving device 102 can opening/closing-drive the slide door 101 in response to a control signal from the ECU 200.

Control Device of Vehicle Opening-Closing Member

Figure 3:
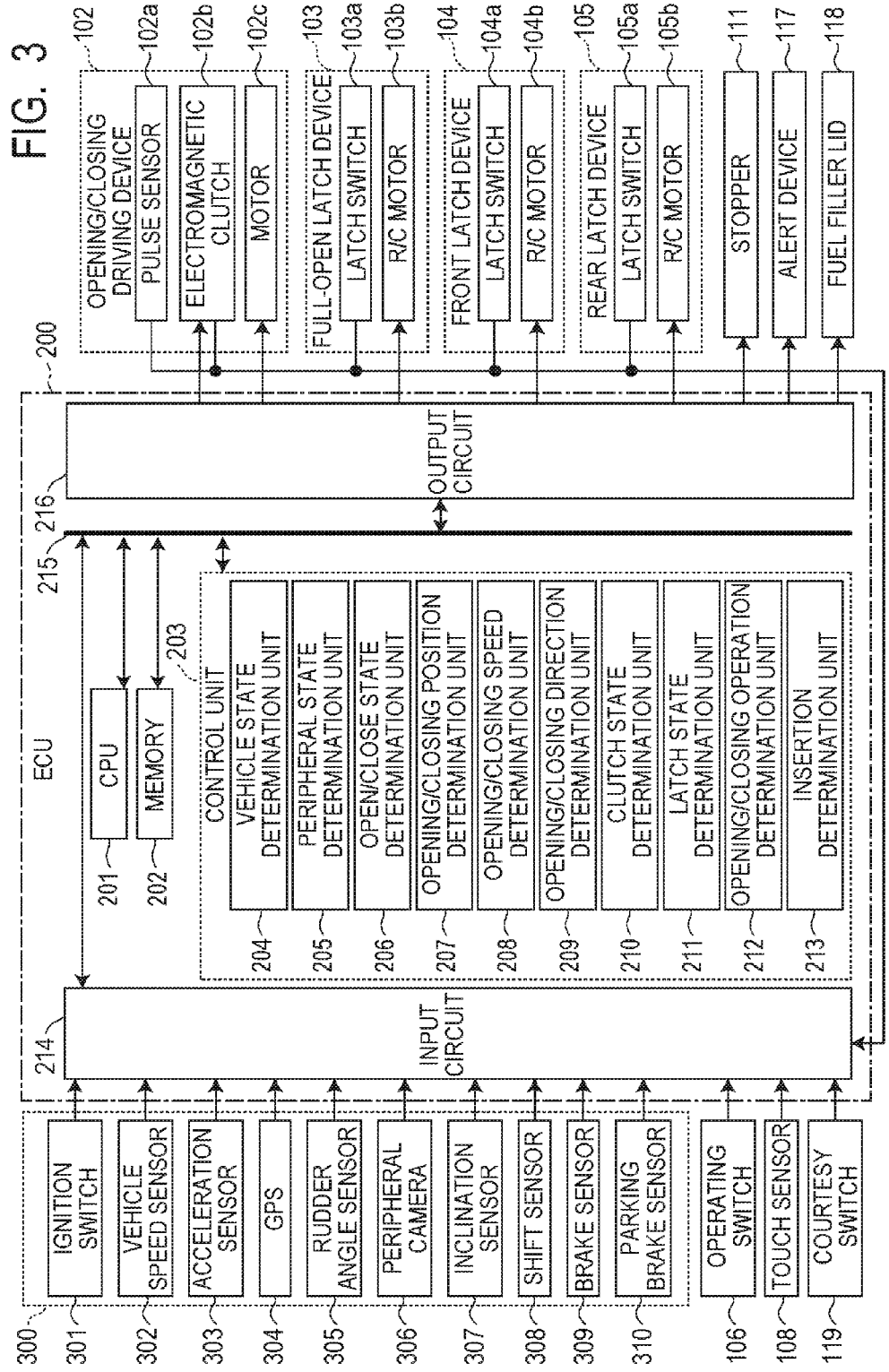
FIG. 3 is a functional block diagram of a control device of the vehicle opening-closing member according to the first embodiment.

FIG. 3 is a functional block diagram of the ECU 200 and the like as a control device of the vehicle opening-closing member. The configuration of the ECU 200 as a control device of the vehicle opening-closing member will be described below in detail.

The ECU 200 includes a CPU (Central Processing Unit) 201, a memory 202, a control unit 203, an input circuit 214, a system bus 215, and an output circuit 216. The control unit 203 cooperates with the CPU 201 and/or the memory 202 to process a signal input to the ECU 200 and has predetermined functions for controlling the opening/closing driving device 102, the full-open latch device 103, the front latch device 104, the rear latch device 105, the stopper 111, the alert device 117, and the fuel filler lid 118. Note that the control unit 203 may be stored within the memory 202 as a software program describing functions executed by the CPU 201 or may be implemented within the ECU 200 as a hardware element. In addition, the ECU 200 may further include hardware elements such as an oscillator providing a clock frequency to the CPU 201, a counter circuit, and the like.

The control unit 203 includes a vehicle state determination unit 204, a peripheral condition determination unit 205, an open/close state determination unit 206, an opening/closing position determination unit 207, an opening/closing speed determination unit 208, an opening/closing direction determination unit 209, a clutch state determination unit 210, a latch state determination unit 211, an opening/closing operation determination unit 212, and an insertion determination unit 213. Each component of the ECU 200 is connected to a power source in which a voltage of a battery (not illustrated) mounted on the vehicle 100 is converted into an appropriate voltage, and exchanges signals to each other via the system bus 215.

The CPU 201 executes calculating processes for implementing predetermined functions, and the memory 202 includes a ROM (Read Only Memory) for storing a program, a RAM (Random Access Memory) for temporal storage, and the like.

The input circuit 214 is input with signals from each of the sensors 301 to 310 of the set of sensors 300, the operating switch 106, the touch sensor 108, the pulse sensor 102a, the electromagnetic clutch 102b, and the latch switches 103a to 105a. The input circuit 214 has an A/D converter and the like and converts input signals into digital signals that can be processed by the CPU 201. The output circuit 216 has a D/A converter and the like and converts input signals into analog signals that are suitable for controlling the electromagnetic clutch 102b, the motor 102c, the R/C motor 103b to 105b, the stopper 111, the alert device 117, and the fuel filler lid 118.

The vehicle state determination unit 204 determines a traveling state of the vehicle 100 based on at least one of the signals from the sensors 301 to 310 of the set of sensors 300. The peripheral condition determination unit 205 determines a peripheral condition around the vehicle 100 based on at least one of the signals from the sensors 301 to 310 of the set of sensors 300. As used herein, "traveling state" of a vehicle includes a state where a vehicle is traveling, a state where a vehicle is making a stop, a state where a vehicle is accelerating or decelerating, a state where a vehicle is turning a curve, and the like. Further, "peripheral condition" around a vehicle includes a condition where a vehicle is on a slope, a condition where there is a danger factor such as another vehicle, an obstacle, a cliff, or the like around a vehicle, a condition where a vehicle is on an expressway, condition where a vehicle is on a curved road, and the like.

The open/close state determination unit 206 determines whether the slide door 101 is in an opening/opened state or a closing/closed state ("open/close state") of the slide door 101 based on at least one of the signals from the latch switches 103a to 105a and the courtesy switch 119. For example, when it is determined by the latch state determination unit 211 that the latch of the slide door 101 is in a half-latch state or an unlatched state, the open/close state determination unit 206 determines the half-latch state or the unlatched state as an opening/opened state of the slide door 101. The opening/closing position determination unit 207 determines the position of the slide door 101 based on a signal from the pulse sensor 102a. The opening/closing speed determination unit 208 determines the opening/closing speed of the slide door 101 based on a signal from the pulse sensor 102a. The opening/closing direction determination unit 209 determines the opening/closing direction of the slide door 101 based on a signal from the pulse sensor 102a. The clutch state determination unit 210 monitors the electromagnetic clutch 102b to determine a failure or a sign of a failure of the electromagnetic clutch 102b. For example, a sign of a failure of the electromagnetic clutch 102b may be determined by monitoring the value of a current flowing in the electromagnetic clutch 102b, storing temporal changes in the current value, and comparing the current value with a predetermined threshold.

The latch state determination unit 211 determines latch states of the full-open latch device 103, the front latch device 104, and the rear latch device 105 based on signals from the latch switches 103a to 105a, respectively. The opening/closing operation determination unit 212 determines user's intention regarding an opening operation or a closing operation of the slide door 101 based on a signal from the operating switch 106. The insertion determination unit 213 determines insertion of an object between the slide door 101 and the vehicle body 100a based on a signal from the touch sensor 108.

The control unit 203 outputs control signals for controlling the electromagnetic clutch 102b, the motor 102c, the R/C motor 103b to 105b, the stopper 111, the alert device 117, and the fuel filler lid 118 to respective elements based on the determination results by respective determination units 204 to 213. In response to the control signals from the ECU 200, the electromagnetic clutch 102b, the motor 102c, the R/C motor 103b to 105b, the stopper 111, the alert device 117, and the fuel filler lid 118 perform predetermined operations.

Next, respective sensors 301 to 310 of the set of sensors 300 will be described. The set of sensors 300 includes an ignition switch 301, a vehicle speed sensor 302, an acceleration sensor 303, a GPS (Global Positioning System) 304, a rudder angle 305, a peripheral camera 306, an inclination sensor 307, a shift sensor 308, a brake sensor 309, and a parking brake sensor 310.

The ignition switch 301 outputs a signal indicating ON or OFF of the ignition to the ECU 200, and the ECU 200 can utilize the signal in order to determine the traveling state of the vehicle 100.

The vehicle speed sensor 302 outputs a signal indicating the speed of the vehicle 100 to the ECU 200, and the ECU 200 can utilize the signal in order to determine the traveling state of the vehicle 100. The acceleration sensor 303 outputs a signal indicating the acceleration (acceleration or deceleration) of the vehicle 100 to the ECU 200, and the ECU 200 can utilize the signal in order to determine the traveling state of the vehicle 100. The GPS 304 outputs a signal indicating the geographical location of the vehicle 100 to the ECU 200, and the ECU 200 can utilize the signal in order to determine the peripheral condition around the vehicle 100.

The rudder angle sensor 305 outputs a signal indicating the angle of a steering wheel to the ECU 200, and the ECU 200 can utilize the signal in order to determine the traveling state of the vehicle 100. The peripheral camera 306 outputs image information around the vehicle 100 to the ECU 200, and the ECU 200 can utilize the information in order to determine the peripheral condition around the vehicle 100. The inclination sensor 307 is formed of a gravity sensor and the like and outputs a signal indicating the inclination angle of the vehicle 100 to the ECU 200, and the ECU 200 can utilize the signal in order to determine the peripheral condition around the vehicle 100. The shift sensor 308 outputs a signal indicating the position of a shift lever (P, R, D, or the like) to the ECU 200, and the ECU 200 can utilize the signal in order to determine the traveling state of the vehicle 100. The brake sensor 309 outputs a signal indicating a brake level to the ECU 200, and the ECU 200 can utilize the signal in order to determine the traveling state of the vehicle 100. Further, the parking brake sensor 310 outputs a signal indicating ON/OFF of a parking brake to the ECU 200, and the ECU 200 can utilize the signal in order to determine a traveling state of the vehicle 100.

Table 1 is a table listing a relationship of traveling states and peripheral conditions of a vehicle exemplified above with respect to the sensors 301 to 310 utilized for determining them.

TABLE 1

| | | 301 | 302 | 303 | 304 | 305 | 306 | 307 | 308 | 309 | 310 |
|---|---|---|---|---|---|---|---|---|---|---|---|
| traveling state | traveling | | | ✓ | ✓ | | ✓ | | | | |
| | stopped | ✓ | ✓ | | | | | | ✓ | ✓ | ✓ |
| | accelerating | ✓ | ✓ | | | | | | | ✓ | |
| | decelerating | | | | | | | | | | |
| | turning curve | | | ✓ | | ✓ | | | | | |
| peripheral condition | slope | | | | | ✓ | | ✓ | ✓ | | |
| | danger factor | | | | | ✓ | | ✓ | ✓ | | |
| | expressway | | | | | ✓ | | ✓ | | | |
| | curved road | | | | | ✓ | | ✓ | | | |

For example, the vehicle state determination unit 203 of the ECU 200 may determine a state where the vehicle 100 is traveling, based on a signal from the vehicle speed sensor 302 (for example, 60 km/h). The vehicle state determination unit 203 of the ECU 200 may determine a state where the vehicle 100 stopped, based on a signal from the ignition switch 301 (for example, OFF), a signal from the vehicle speed sensor 302 (for example, 0 km/h), and a signal from the shift sensor 308 (for example, P). The vehicle state determination unit 203 of the ECU 200 may determine a state where the vehicle 100 is turning a curve, based on a signal from the vehicle speed sensor 302 (for example, 40 km/h) and a signal from the rudder angle sensor 305 (for example, 20 degrees). The peripheral condition determination unit 204 of the ECU 200 processes image information from the peripheral camera 306 and, based on the process result, may determine a condition where there is a cliff near the slide door 101 provided in the left side of the vehicle 100. Based on a signal from the GPS 304, the peripheral condition determination unit 204 of the ECU 200 may refer to map information pre-stored in the memory 202 to determine a condition where the vehicle 100 is on an expressway. Further, the peripheral condition determination unit 204 of the ECU 200 may determine a condition where the vehicle 100 is on a slope, based on a signal from the inclination sensor 307 (for example, 15 degrees). Note that the present embodiment is not at all limited to these examples.

Control Method of Vehicle Opening-Closing Member

A control method performed by the control device of the vehicle opening-closing member according to the present embodiment will be described. Upon determining an opening/opened state of the opening-closing member during the vehicle traveling, the control device of the vehicle opening-closing member according to the present embodiment stops an unintended opening motion of the opening-closing member by performing at least one of a short brake of a motor that opening/closing-drives the opening-closing member and a connection of an electromagnetic clutch.

Figure 4:
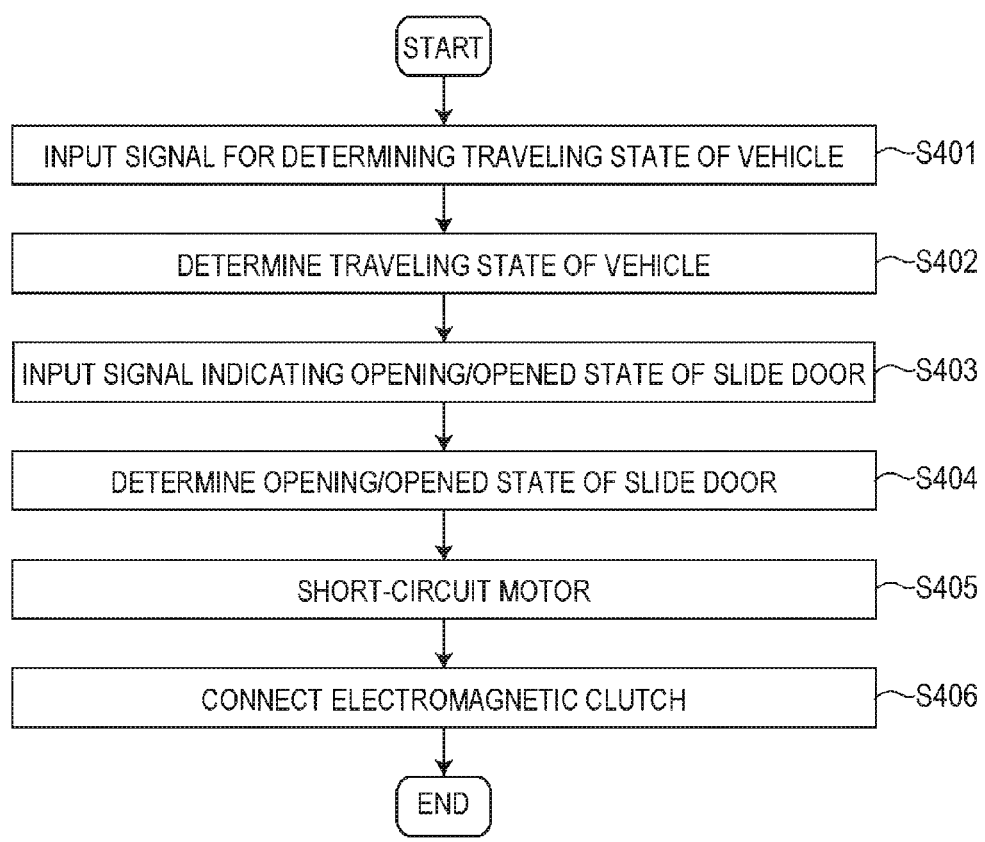
FIG. 4 is a control flowchart of the control device of the vehicle opening-closing member according to the first embodiment.

FIG. 4 is a control flowchart of the slide door 101 as an opening-closing member performed by the ECU 200 as a control device of the vehicle opening-closing member.

At step S401, the ECU 200 is input with a signal indicating a traveling state of the vehicle from at least one of the sensors 301 to 310 of the set of sensors 300. For example, the ECU 200 is input with a signal indicating the speed of the vehicle 100 from the vehicle speed sensor 302 and a signal indicating the acceleration of the vehicle 100 from the acceleration sensor 303.

At step S402, the vehicle state determination unit 204 of the ECU 200 determines a state where the vehicle 100 traveling, based on the input signal indicating the traveling state of the vehicle.

At step S403, the ECU 200 is input with a signal indicating an opening/opened state of the slide door from at least one of the latch switches 103a to 105a and the courtesy switch 119. For example, the ECU 200 is input with a signal indicating an unlatch or a half latch from the latch switches 104a and 105a of the front latch device 104 and 105. Otherwise, the ECU 200 is input with a signal indicating an opening/opened state of the slide door 101 from the courtesy switch 119.

At step S404, based on the input signal indicating an opening/opened state of the slide door, the open/close state determination unit 206 of the ECU 200 determines that the slide door 101 is in an opening/opened state. Note that the order of the steps S401 to S404 may be properly changed.

If the vehicle state determination unit 204 determines that the vehicle 100 is in a state of traveling (S402) and if the open/close state determination unit 206 determines that the slide door 101 is in an opening/opened state (S404), the control unit 203 of the ECU 200 generates a control signal for causing a short brake of the motor 102c and outputs it to the opening/closing driving device 102 at step S405. In response to the control signal, the opening/closing driving device 102 causes the motor 102c to be short-circuited to provide a function as a short brake.

At step S406, the control unit 203 generates a control signal for causing the electromagnetic clutch 102b to be in connected state and outputs it to the opening/closing driving device 102. In response to the control signal, the opening/closing driving device 102 causes the electromagnetic clutch 102b to be in a connected state.

Note that step S405 may be omitted when it is possible to stop an opening motion of the slide door 101 by causing the electromagnetic clutch 102b to be in connected state, and step S406 may be omitted when the electromagnetic clutch 102b has already been in a connected state. Further, the order of steps S405 and S406 may be properly changed.

Further, when the vehicle slows down (for example, at a low speed) or stops after the ECU 200 has stopped an opening motion of the slide door 101, the ECU 200 may receive an opening/closing operation from the operating switch 106 and cause the electromagnetic clutch 102b to be in a disconnected state so that the slide door 101 can be manually opened or closed. This improves convenience of the user. Further, when the open/close state determination unit 206 determines a half-latch state or an unlatched state of the latch of the slide door 101 as an opening/opened state of the slide door 101, the control unit 203 of the ECU 200 may output a control signal for causing the latch to be in a full-latch state. This causes the latch of the slide door 101 to be in a full-latch state and further improves safety of the user. When the latch fails and does not enter a full-latch state, the ECU 200 may further output a control signal to the alert device 117 and, in response to the control signal, the alert device 117 may notify the user of a failure of the latch. In this way, the control process by the ECU 200 for improving convenience and/or safety of the user after stopping an opening motion of the slide door 101 can be applied to other embodiments in a similar manner.

According to the control device of the vehicle opening-closing member of the present embodiment, upon determining an opening/opened state of the opening-closing member during the vehicle traveling, the control device can stop an unintended opening motion of the opening-closing member by performing at least one of a short brake of a motor for opening/closing-driving the opening-closing member and a connection of an electromagnetic clutch. This also results in a reduced likelihood of a drop of luggage or the like.

In such a way, the control device and the control method of the vehicle opening-closing member according to the present embodiment realizes a fail-safe against an unintended opening motion of an opening-closing member during the vehicle traveling.

Second Embodiment

A control device and a control method of a vehicle opening-closing member according to a second embodiment of the present invention will be described. Note that the configuration of the opening-closing member, the control device thereof, and the like in the present embodiment and the following embodiments are substantially the same as those of the first embodiment.

In response to determine an opening/opened state of an opening-closing member during a vehicle traveling, the control device of the vehicle opening-closing member according to the present embodiment stops an unintended opening motion of the opening-closing member and closing-actuates the opening-closing member by driving, in the direction of closing, a motor that opening/closing-drives the opening-closing member.

Figure 5:
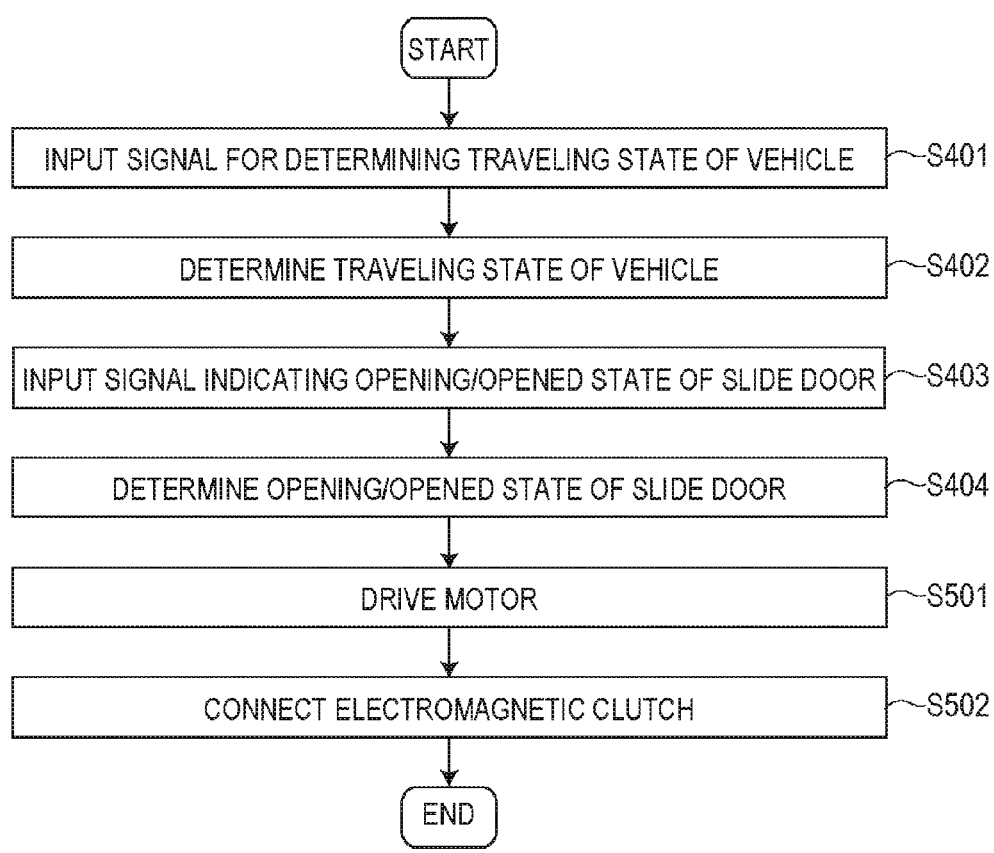
FIG. 5 is a control flowchart of a control device of a vehicle opening-closing member according to a second embodiment.

FIG. 5 is a control flowchart of the slide door 101 as an opening-closing member performed by the ECU 200 as a control device of the vehicle opening-closing member. Steps S401 to S404 are the same as those in the first embodiment, and description thereof will be omitted.

At step S501, when the vehicle state determination unit 204 determines that the vehicle 100 is in a traveling state and when the open/close state determination unit 206 determines that the slide door 101 is in an opening/opened state, the control unit 203 of the ECU 200 outputs, to the opening/closing driving device 102, a control signal for driving the motor 102c in the direction of closing. In response to the control signal, the opening/closing driving device 102 drives the motor 102c in the direction of closing to closing-actuate the slide door 101. Note that the control unit 203 may stop the slide door 101 within a range such that luggage or the like does not drop out of a gap between the slide door 101 and the vehicle body 100a (for example, several centimeters to several tens of centimeters) without causing the slide door 101 to be in a fully closed state. Further, when the insertion determination unit 213 of the ECU 200 determines insertion based on a signal from the touch sensor 108 during a closing motion of the slide door 101, the closing actuation of the slide door 101 may be stopped.

At step S502, the control unit 203 generates a control signal for causing the electromagnetic clutch 102b to be in a connected state and outputs it to the opening/closing driving device 102. In response to the control signal, the opening/closing driving device 102 causes the electromagnetic clutch 102b to be in a connected state. The motive power of the motor 102c transfers to the slide door 101 via the electromagnetic clutch 102b, and the slide door 101 performs a closing motion. Note that step S502 may be omitted when the electromagnetic clutch 102b has already been in a connected state, and the order of steps S501 and S502 may be reversed.

According to the control device of the vehicle opening-closing member of the present embodiment, upon determining an opening/opened state of the opening-closing member during the vehicle traveling, the control device stops an unintended opening motion of the opening-closing member and then further closing-actuates the opening-closing member by driving, in the direction of closing, a motor that opening/closing-drives the opening-closing member, causing an electromagnetic clutch to be in a connected state, and then closing-actuating the opening-closing member. This also results in a reduced likelihood of a drop of luggage or the like.

In such a way, the control device and the control method of a vehicle opening-closing member according to the present embodiment realizes a fail-safe against an unintended opening motion of the opening-closing member during the vehicle traveling.

Third Embodiment

A control device and a control method of a vehicle opening-closing member according to a third embodiment of the present invention will be described. When determining an opening/opened state of the opening-closing member during the vehicle traveling, the control device of the vehicle opening-closing member according to the present embodiment stops an unintended opening motion of the opening-closing member and then closing-actuates the opening-closing member according to the position of the opening-closing member.

FIG. 6 is a control flowchart of the slide door 101 as an opening-closing member performed by the ECU 200 as a control device of the vehicle opening-closing member. Steps S401 to S406 are the same as those in the first embodiment, and description thereof will be omitted.

At step S601, the ECU 200 is input with a signal indicating the position of the slide door from the pulse sensor 102a.

At step S602, the opening/closing position determination unit 207 of the ECU 200 determines the position of the slide door 101 based on the input signal indicating the position of the slide door.

At step S603, the control unit 203 of the ECU 200 determines whether or not the position of the slide door 101 is within a predetermined range. The predetermined range as used herein is preferably a range where luggage or the like does not drop out of a gap between the slide door 101 and the vehicle body 100a (for example, a width of several centimeters to several tens of centimeters) and is pre-stored in the memory 202.

At step S604, when the position of the slide door 101 is not within the predetermined range, the control unit 203 generates a control signal for driving the motor 102c in the direction of closing and outputs it to the opening/closing driving device 102. In response to the control signal, the opening/closing driving device 102 drives the motor 102c in the direction of closing, and closing-actuates the slide door 101 so that the width of a gap between the slide door 101 and the vehicle body 100a is at least within the predetermined range.

At step S605, when the position of the slide door 101 is within the predetermined range, the control unit 203 generates a control signal for actuating the alert device 117 and outputs it to the alert device 117. In response to the control signal, the alert device 117 generates a sound and/or a light or performs a display indicating an alert to notify the user of the slide door 101 being in an opening/opened state. Note that the ECU 200 may output control signal for causing the electromagnetic clutch 102b to be in a disconnected state so as to enable the alerted user to manually close the slide door 101. In addition, step S605 may be omitted.

According to the control device of the vehicle opening-closing member of the present embodiment, upon determining an opening/opened state of the opening-closing member during the vehicle traveling, the control device short-circuits a motor that opening/closing-drives the opening-closing member, causes the electromagnetic clutch to be in a connected state, stops the opening-closing member, and, furthermore, closing-actuates the opening-closing member when the position of the opening-closing member is not within a predetermined range. This also results in a reduced likelihood of a drop of luggage or the like.

In such a way, the control device and the control method of the vehicle opening-closing member according to the present embodiment realizes a fail-safe against an unintended opening motion of the opening-closing member during the vehicle traveling.

Fourth Embodiment

A control device and a control method of a vehicle opening-closing member according to a fourth embodiment of the present invention will be described. In the present embodiment, in response to determine an opening/opened state of the opening-closing member during the vehicle traveling, the control device of the vehicle opening-closing member actuates a stopper that inhibits movement in the opening direction of the opening-closing member and stops the unintended opening motion of the opening-closing member.

Figure 7A:
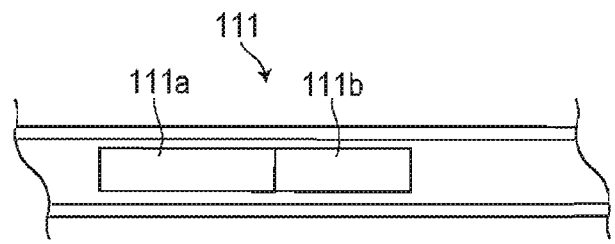
FIG. 7A is a conceptual view illustrating usage of stopper.
Figure 7B:
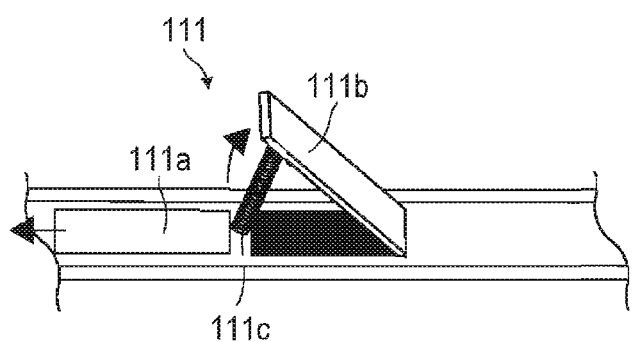
FIG. 7B is a conceptual view illustrating the usage of the stopper.
Figure 7C:
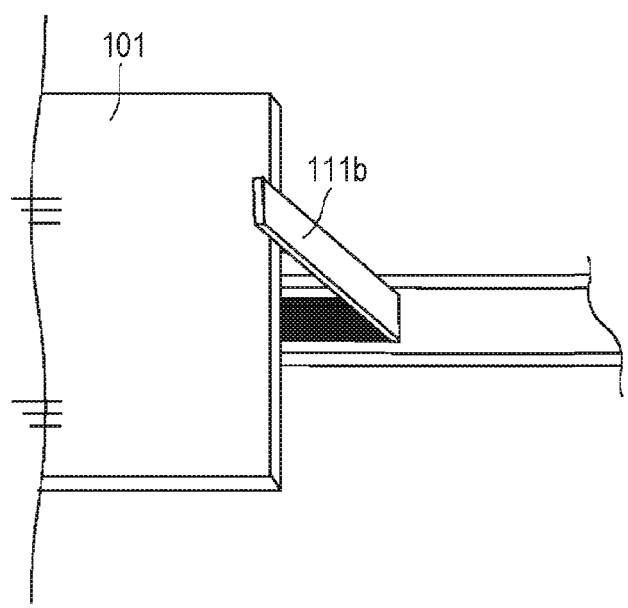
FIG. 7C is a conceptual view illustrating the usage of the stopper.

FIG. 7A to FIG. 7C are conceptual views illustrating usage of the stopper. In response to control signal from the ECU 200, a first portion 111a of the stopper 111 slides (FIG. 7A), a second portion 111b of the stopper 111 projects due to a force of an elastic member 111c (FIG. 7B), and the second portion 111b receives the slide door 101 (FIG. 7C). In this way, the stopper 111 stops an opening motion of the slide door 101.

Note that the stopper inhibiting movement in the opening direction of the opening-closing member is not limited to such a mechanism, but may be any mechanism that actuates in response to a control signal from the control device of the opening-closing member and receives and stops the opening-closing member. For example, the fuel filler lid 118 may be used as a stopper, and the fuel filler lid 118 may be actuated and opened to receive and stop the slide door 101. Further, the position of the stopper 111 is designed such that luggage or the like does not drop out of a gap (for example, several centimeters to several tens of centimeters) between the vehicle body 100a and the slide door 101 at a position where the slide door 101 is stopped by the stopper 111.

Figure 7D:
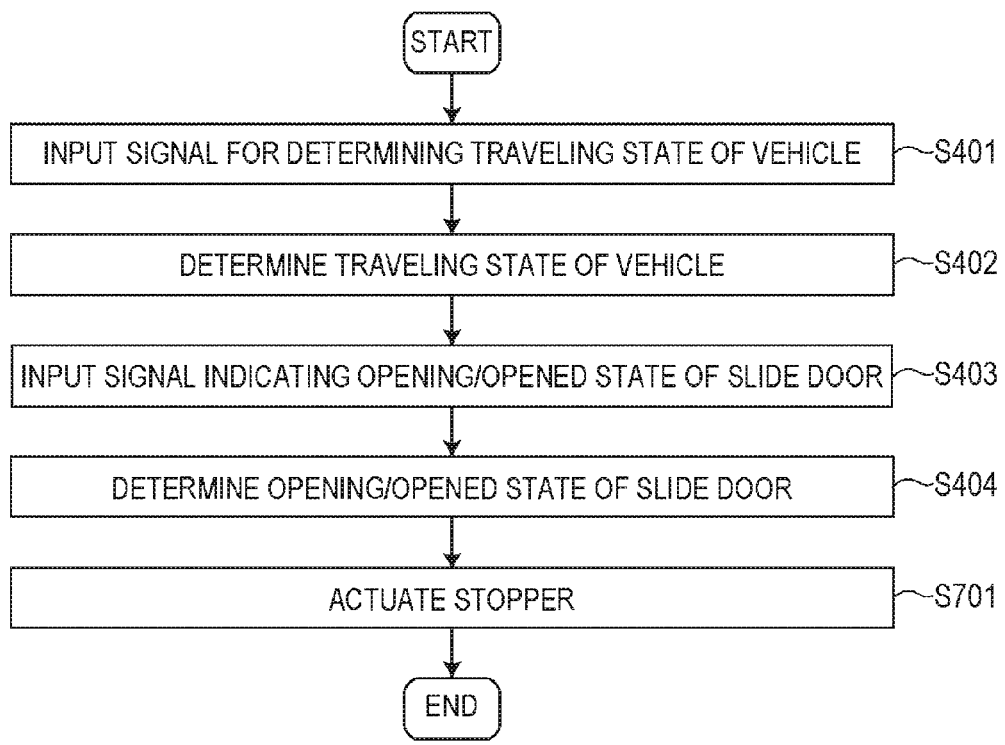
FIG. 7D is a control flowchart of a control device of a vehicle opening-closing member according to a fourth embodiment.

FIG. 7D is a control flowchart of the slide door 101 as an opening-closing member performed by the ECU 200 as a control device of the vehicle opening-closing member. Steps S401 to S404 are the same as those in the first embodiment, and description thereof will be omitted.

At step S701, the control unit 203 of the ECU 200 generates a control signal for actuating the stopper 111 and outputs it to the stopper 111. In response to the control signal, the stopper 111 projects and then receives and stops the slide door 101.

According to the control device of the vehicle opening-closing member of the present embodiment, upon determining an opening/opened state of the opening-closing member during the vehicle traveling, the control device actuates the stopper to stop an unintended opening motion of the opening-closing member. This also results in a reduced likelihood of a drop of luggage or the like.

In such a way, the control device and the control method of the vehicle opening-closing member according to the present embodiment realizes a fail-safe against an unintended opening motion of the opening-closing member during the vehicle traveling.

Fifth Embodiment

A control device and a control method of a vehicle closure according to a fifth embodiment of the present invention will be described. In the present embodiment, when determining an opening/opened state of the opening-closing member during the vehicle traveling, the control device of the vehicle opening-closing member takes into account of the acceleration of the vehicle and/or the gravity and enhances driving of a motor, which opening/closing-drives the opening-closing member, to closing-actuate the opening-closing member.

Figure 8:
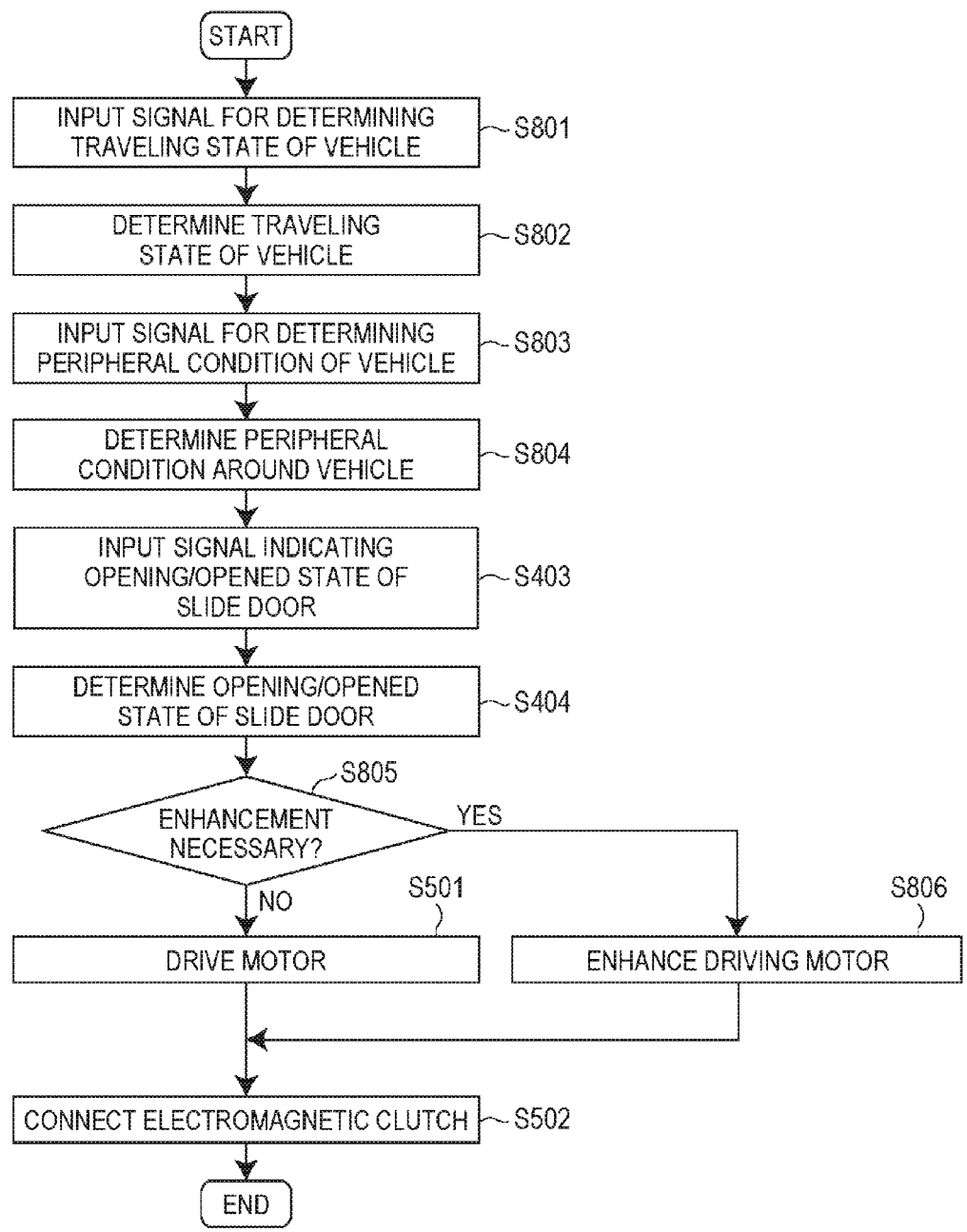
FIG. 8 is a control flowchart of a control device of a vehicle opening-closing member according to a fifth embodiment.

FIG. 8 is a control flowchart of the slide door 101 as an opening-closing member performed by the ECU 200 as a control device of the vehicle opening-closing member. Steps S403, S404, S501, and S502 are the same as those in the first and second embodiments, and description thereof will be omitted.

At step S801, the ECU 200 is input with a signal indicating a traveling state of the vehicle from at least one of the sensors 301 to 310 of the set sensors 300. For example, the ECU 200 is input with a signal indicating the speed of the vehicle 100 from the vehicle speed sensor 302 and the acceleration of the vehicle 100 from the acceleration sensor 303 and/or the brake sensor 309.

At step S802, based on the input signal indicating a traveling state of the vehicle, the vehicle state determination unit 204 of the ECU 200 determines that the vehicle 100 is in a traveling state and the vehicle 100 is in an accelerating or decelerating state.

At step S803, the ECU 200 is input with a signal indicating a peripheral condition around the vehicle from at least one of the sensors 301 to 310 of the set of sensors 300. For example, the ECU 200 is input with a signal indicating that the vehicle 100 is inclined by a predetermined angle (for example, −5 degrees or less, +5 degrees or more) from the inclination sensor 307 and/or a signal indicating position information from the GPS 304.

At step S804, based on the input signal indicating the peripheral condition around the vehicle, the peripheral condition determination unit 205 of the ECU 200 determines a condition that the vehicle 100 is on a downward or upward slope. For example, by comparing position information from the GPS 304 with pre-stored map information, the ECU 200 may determine a condition that the vehicle 100 is on a slope.

At step S805, the control unit 203 of the ECU 200 determines whether or not it is necessary to increase the rotation speed of the motor 102c to enhance driving of the motor 102c. For example, when the vehicle 100 is in a state of accelerating or a condition of traveling on an upward slop, the control unit 203 determines that it is necessary to enhance driving of the motor 102c. This is because, when the vehicle 100 is accelerating or traveling on an upward slope, the slide door 101 may be subjected to a faster opening motion due to the effect of an inertial force and/or the gravity than in the case where the vehicle 100 is traveling at a constant speed or on a flat ground. In order to reduce such an effect of the inertial force or the gravity, the driving of the motor 102c in the direction of closing is enhanced, that is, the rotation speed of the motor 102c is increased.

At step S806, when determining that the enhancement is required, the control unit 203 generates a control signal for enhancing driving of the motor 102c and outputs it to the opening/closing driving device 102. In response to the control signal, the opening/closing driving device 102 enhances the driving of the motor 102c in the direction of closing and increases the speed of the closing actuation of the slide door 101.

According to the control device of the vehicle opening-closing member of the present embodiment, upon determining an opening/opened state of the opening-closing member during the vehicle traveling and determining at least one of a state of the vehicle being accelerating and a condition of the vehicle being on a slope, the control device enhances driving of a motor that opening/closing-drives the opening-closing member and increases the speed of the closing actuation of the opening-closing member. This can reduce the effect of an inertial force and/or the gravity applied to the opening-closing member and reduce the likelihood of a drop of luggage or the like even when there is an unintended opening motion of the opening-closing member during the vehicle traveling.

In such a way, the control device and the control method of the vehicle opening-closing member according to the present embodiment realizes a fail-safe against an unintended opening motion of the opening-closing member during the vehicle traveling.

Sixth Embodiment

A control device and a control method of a vehicle opening-closing member according to a sixth embodiment of the present invention will be described. In the present embodiment, upon being input with a signal indicating a half-latch state during the vehicle traveling, the control device of the vehicle opening-closing member reduces an unintended opening motion of the opening-closing member by driving an R/C motor to switch the latch to a full-latch state.

Figure 9:
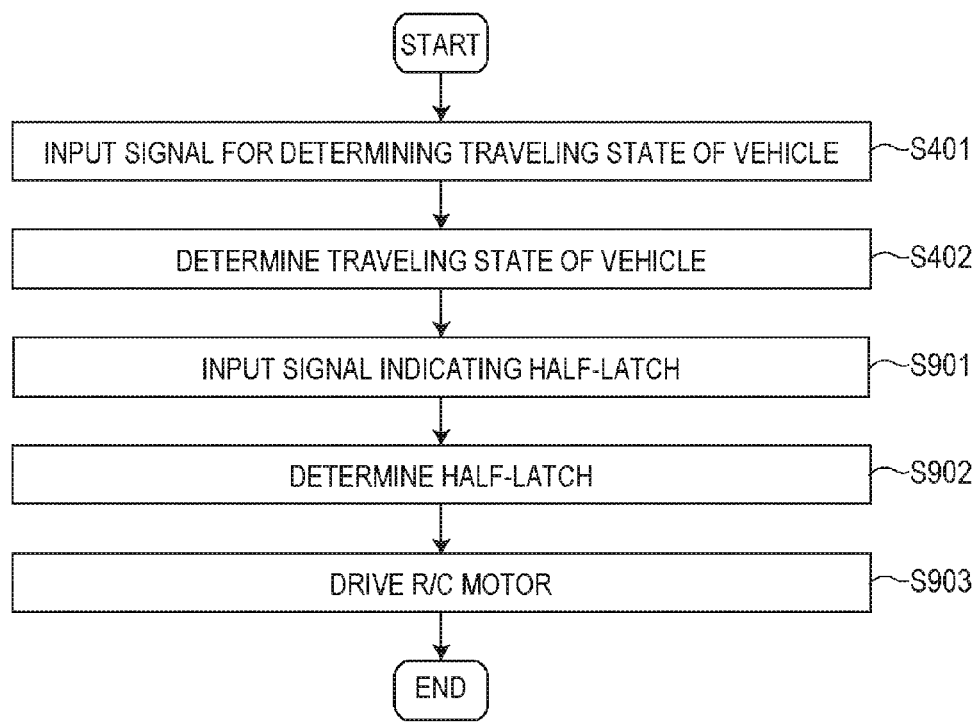
FIG. 9 is a control flowchart of a control device of vehicle opening-closing member according to a sixth embodiment.

FIG. 9 is a control flowchart of the slide door 101 as an opening-closing member performed by the ECU 200 as a control device of the vehicle opening-closing member. Steps S401 and S402 are the same as those in the first embodiment, and description thereof will be omitted.

At step S901, the ECU 200 is input with a signal indicating a half-latch state from at least one of the latch switch 104a of the front latch device 104 and the latch switch 105a of the rear latch device 105.

At step S902, based on the input signal indicating half-latch state, the latch state determination unit 211 of the ECU 200 determines that at least one of the front latch device 104 and the rear latch device 105 is in a half-latch state.

At step S903, the control unit 203 of the ECU 200 generates control signals for driving the R/C motors 104b and 105b of the latch devices 104 and 105 in a half-latch state and outputs them to the latch devices 104 and 105. In response to the control signal, the latch devices 104 and 105 each engage a latch to a striker to a full-latch state.

According to the control device of the vehicle opening-closing member of the present embodiment, when an opening-closing member becomes almost unlatched during the vehicle traveling, the control device can reduce an unintended opening motion of the opening-closing member by automatically causing the latch to be in a full-latch state. This also results in a reduced likelihood of a drop of luggage or the like.

In such a way, the control device and the control method of the vehicle opening-closing member according to the present embodiment realizes a fail-safe against an unintended opening motion of the opening-closing member during the vehicle traveling.

Seventh Embodiment

A control device and a control method of a vehicle opening-closing member according to a seventh embodiment of the present invention will be described. In the present embodiment, the control device of the vehicle opening-closing member determines an opening/opened state of the opening-closing member during the vehicle traveling and, furthermore, changes means for stopping the opening motion of the opening-closing member in accordance with a state of an electromagnetic clutch.

FIG. 10 is a control flowchart of the slide door 101 as an opening-closing member performed by the ECU 200 as a control device of the vehicle opening-closing member. Steps S401 to S406 and S701 are the same as those in the first and fourth embodiments, and description thereof will be omitted.

At step S1001, the ECU 200 is input with a signal indicating a state of an electromagnetic clutch from the electromagnetic clutch 102b. The signal indicating a state of the electromagnetic clutch may be a signal indicating that the electromagnetic clutch 102b is normal or has failed or indicating a sign of a failure. A sign of failure may be determined by measuring a value of a current flowing in the electromagnetic clutch and comparing the value with a threshold.

At step S1002, based on a signal indicating a state of the electromagnetic clutch, the clutch state determination unit 210 of the ECU 200 determines whether or not the electromagnetic clutch 102b has failed or indicates a sign of a failure.

At step S1003, the control unit 203 of the ECU 200 causes the electromagnetic clutch 102b to be in a connected state when the electromagnetic clutch 102b is normal (step S406), while the control unit 203 of the ECU 200 drives the stopper 111 without connecting the electromagnetic clutch 102b when the electromagnetic clutch 102b has failed or is likely to fail (step S701).

The control device of the vehicle opening-closing member according to the present embodiment determines an opening/opened state of the opening-closing member during the vehicle traveling and, in accordance with a state of an electromagnetic clutch, changes means for stopping an unintended opening motion of the opening-closing member. This allows for stopping an unintended opening motion of the opening-closing member when the opening-closing member unintendedly opens during the vehicle traveling and even when the electromagnetic clutch has failed. This also results in a reduced likelihood of a drop of luggage or the like.

In such a way, the control device and the control method of the vehicle opening-closing member according to the present embodiment realizes a fail-safe against an unintended opening motion of the opening-closing member during the vehicle traveling.

This application claims priority to Japanese Patent Application No. 2013-224061, filed Oct. 29, 2013, the contents of which are incorporated as a part of this application.

LIST OF REFERENCE NUMERALS

100: vehicle
100a: vehicle body
101: slide door (opening-closing member)
102: opening/closing driving device
103: full-open latch device
104: front latch device
105: rear latch device
108: touch sensor
111: stopper
117: alert device
118: fuel filler lid
119: courtesy switch
200: ECU (control device of vehicle opening-closing member)
203: control unit
204: vehicle state determination unit
205: peripheral condition determination unit
206: open/close state determination unit
207: opening/closing position determination unit
208: opening/closing speed determination unit
209: opening/closing direction determination unit
210: clutch state determination unit
211: latch state determination unit
212: opening/closing operation determination unit
213: insertion determination unit
214: input circuit
216: output circuit
301: ignition switch
302: vehicle speed sensor
303: acceleration sensor
304: GPS
305: rudder angle sensor
306: peripheral camera 307
307: inclination sensor
308: shift sensor
309: brake sensor
310: parking brake sensor

The invention claimed is:

1. A control device of a vehicle opening-closing member, the control device comprising:
a vehicle state determination unit that determines a traveling state of the vehicle based on a signal indicating a traveling state of a vehicle;
an open/close state determination unit that determines an opening/opened state of the opening-closing member based on a signal indicating an opening/opened state of an opening-closing member provided to the vehicle;
a control unit that outputs a control signal for stopping an opening motion of the opening-closing member when it is determined by the vehicle state determination unit that the vehicle is in a state of traveling and when it is determined by the open/close state determination unit that the opening-closing member is in an opening/opened state; and
a latch state determination unit that determines that the latch is in a half-latch state or an unlatched state based on a signal indicating a latch state of a latch of the opening-closing member,
wherein the open/close state determination unit determines a half-latch state or an unlatched state of the latch as an opening/opened state of the opening-closing member.

2. The control device according to claim 1, wherein the control signal for stopping an opening motion of the opening-closing member includes at least one of a control signal for causing an electromagnetic clutch of the opening-closing member to be in a connected state, a control signal for short-circuiting a motor that opening/closing-drives the opening-closing member, a control signal for driving the motor in a direction of closing, and a control signal for actuating a stopper that inhibits movement of the opening-closing member in an opening direction.

3. The control device according to claim 1 further comprising an opening/closing position determination unit that determines a position of the opening-closing member based on a signal indicating a position of the opening-closing member,
wherein, when the control unit determines that a position of the opening-closing member is not within a predetermined range based on a determination result of the opening/closing position determination unit, the control unit outputs a control signal for closing-actuating the opening-closing member so that the opening-closing member is located within the predetermined range.

4. The control device according to claim 1, wherein, when it is determined by the latch state determination unit that the latch is in a half-latch state or an unlatched state, the control unit outputs a control signal for causing the latch to be in a full-latch state.

5. The control device according to claim 1 further comprising a peripheral condition determination unit that determines a peripheral condition of the vehicle based on a signal indicating a peripheral condition around the vehicle,
wherein, when it is determined by the vehicle state determination unit that the vehicle is in a traveling state and it is determined by the open/close state determination unit that the opening-closing member is in an opening/opened state, and when the control unit determines that it is necessary to enhance driving of the motor of the opening-closing member based on at least one of determination results of the traveling state determination unit and the peripheral state determination unit, the control unit enhances driving of the motor.

6. A control method of a vehicle opening-closing member, the control method comprising the steps of:
inputting a first signal indicating a traveling state of a vehicle;
determining that the vehicle is in a traveling state based on the first signal;
inputting a second signal indicating an opening/opened state of an opening-closing member provided to the vehicle;
determining that the opening-closing member is in an opening/opened state based on the second signal;
inputting a signal indicating a latch state of a latch of the opening-closing member;
determining that the latch is in a half-latch state or an unlatched state based on the signal indicating the latch state;
determining a half-latch state or an unlatched state of the latch as an opening/opened state of the opening-closing member; and
outputting a control signal for stopping an opening motion of the opening-closing member, wherein the control signal for stopping an opening motion of the opening-closing member includes at least one of a control signal for causing an electromagnetic clutch of the opening-closing member to be in a connected state, a control signal for short-circuiting a motor that opening/closing-drives the opening-closing member, a control signal for driving the motor in a direction of closing, and a control signal for actuating a stopper that inhibits movement of the opening-closing member in an opening direction.

7. A control device of a vehicle opening-closing member, the control device comprising:

a vehicle state determination unit that determines a traveling state of the vehicle based on a signal indicating a traveling state of a vehicle;
an open/close state determination unit that determines an opening/opened state of the opening-closing member based on a signal indicating an opening/opened state of an opening-closing member provided to the vehicle;
a control unit that outputs a control signal for stopping an opening motion of the opening-closing member when it is determined by the vehicle state determination unit that the vehicle is in a state of traveling and when it is determined by the open/close state determination unit that the opening-closing member is in an opening/opened state; and
a peripheral condition determination unit that determines a peripheral condition of the vehicle based on a signal indicating a peripheral condition around the vehicle,
wherein, when it is determined by the vehicle state determination unit that the vehicle is in a traveling state and it is determined by the open/close state determination unit that the opening-closing member is in an opening/opened state, and when the control unit determines that it is necessary to enhance driving of the motor of the opening-closing member based on at least one of determination results of the traveling state determination unit and the peripheral state determination unit, the control unit enhances driving of the motor.

8. The control device according to claim 7, wherein the control signal for stopping an opening motion of the opening-closing member includes at least one of a control signal for causing an electromagnetic clutch of the opening-closing member to be in a connected state, a control signal for short-circuiting a motor that opening/closing-drives the opening-closing member, a control signal for driving the motor in a direction of closing, and a control signal for actuating a stopper that inhibits movement of the opening-closing member in an opening direction.

9. The control device according to claim 7 further comprising an opening/closing position determination unit that determines a position of the opening-closing member based on a signal indicating a position of the opening-closing member,
wherein, when the control unit determines that a position of the opening-closing member is not within a predetermined range based on a determination result of the opening/closing position determination unit, the control unit outputs a control signal for closing-actuating the opening-closing member so that the opening-closing member is located within the predetermined range.

10. The control device according to claim 7 further comprising a latch state determination unit that determines that the latch is in a half-latch state or an unlatched state based on a signal indicating a latch state of a latch of the opening-closing member,
wherein the open/close state determination unit determines a half-latch state or an unlatched state of the latch as an opening/opened state of the opening-closing member.

11. The control device according to claim 10, wherein, when it is determined by the latch state determination unit that the latch is in a half-latch state or an unlatched state, the control unit outputs a control signal for causing the latch to be in a full-latch state.

12. A control method of a vehicle opening-closing member, the control method comprising the steps of:
inputting a first signal indicating a traveling state of a vehicle;

determining that the vehicle is in a traveling state based on the first signal;

inputting a second signal indicating an opening/opened state of an opening-closing member provided to the vehicle;

determining that the opening-closing member is in an opening/opened state based on the second signal;

inputting a signal indicating a peripheral condition around the vehicle;

determining a peripheral condition of the vehicle based on the signal indicating a peripheral condition around the vehicle;

determining, when it is determined that the vehicle is in a traveling state and it is determined that the opening-closing member is in an opening/opened state, that it is necessary to enhance driving of the motor of the opening-closing member based on at least one of determination results of the step of determining that the vehicle is in a traveling state and the step of determining that the opening-closing member is in an opening/opened state;

enhancing driving of the motor when it is determined that it is necessary to enhance driving of the motor; and outputting a control signal for stopping an opening motion of the opening-closing member, wherein the control signal for stopping an opening motion of the opening-closing member includes at least one of a control signal for causing an electromagnetic clutch of the opening-closing member to be in a connected state, a control signal for short-circuiting a motor that opening/closing-drives the opening-closing member, a control signal for driving the motor in a direction of closing, and a control signal for actuating a stopper that inhibits movement of the opening-closing member in an opening direction.

* * * * *